2,744,875

CELLULAR PHENOLIC RESIN MATERIALS

Frank W. Thomas, Burbank, and Eli Simon, Los Angeles, Calif., assignors to Lockheed Aircraft Corporation, Burbank, Calif.

No Drawing. Application June 14, 1951,
Serial No. 231,673

4 Claims. (Cl. 260—2.5)

This invention relates to foamed or cellular plastics and relates more particularly to porous or cellular phenolic resin plastic materials or products.

Prior to our invention, cellular phenolic resin plastics were proposed and introduced. However, so far as we are aware, the acceptance of these materials has been quite limited owing to their poor or weak physical strength characteristics. The low-strength nature of these prior materials has been such that they are not well adapted to structural applications where they are required to serve as load carriers. Furthermore, although the prior phenolic foams may be suitable in some situations as thermal and/or acoustical insulation, and the cell size may not be uniform, there often being regions of overly large cells, resulting in a non-uniform insulating effect.

It is an object of our invention to provide low-density cellular or foamed phenolic resin plastics that are suitable both for insulating and structural applications. If desired, low-weight tenuous foams of relatively low strength may be produced for the type of uses or applications where space-filling, thermal and/or acoustical insulation is required as in walls, ceilings, panels, etc. the material being of substantial uniform texture and cell size throughout, or the foams or materials of the invention may be compounded to be suitable for structural uses wherein they serve as structural load assuming sections or components as in laminated sandwich type panels, internally filled and reinforced elements, or both as insulating and load assuming materials as in refrigerator insulation, building panels, etc.

Another object of the invention is to provide porous or cellular plastic materials of this character in which the sizes of the gas filled cells may be varied or controlled to obtain the optimum characteristics and performance for the particular or intended applications. For example, where the material is to be used as insulation, it may be compounded to have very small cells whereas when intended for structural applications the formulation may be such as to result in cells of larger diameter.

Another object of the invention is to provide cellular phenolic resin materials that have excellent adherence to the surfaces of practically all solids when allowed to react in situ, that is when poured in place or otherwise applied as a liquid reactant mass and allowed to react in its intended final location. This characteristic or ability of the material well suits it for many applications where insulating and/or structural light-weight filler material is best utilized by being poured in place or applied as a liquid or partially liquid mass to react and finally and uniformly adhere to the internal surfaces of the parts.

A further object of the invention is to provide phenolic resin foamed or cellular materials of this nature which are the products of mutual or dual reaction; i. e. (1) an initial reaction between a special acid catalyst and a gassing agent such as aluminum, and (2) a second reaction taking place during the first and increasing the chain length of the diphenol alcohols of the resol type phenolic resins employed, the chain growing at a slow and controlled rate as a result of the acid combination or blend constituting the catalyst, one acid serving to reduce or slow down the rate of reaction of the other. The character of the gassing medium employed, preferably a metal leafing powder, and the nature of the blend of acids forming the catalyst, materially contribute to the controlled and regular foaming reaction of the phenolic resin mass resulting in a product having uniform cell structure and distinguishing from the prior products of this general kind wherein the reaction is uncontrolled and the product is oftentimes non-uniform. Furthermore, the controlled reaction provides ample pouring, spreading or working time, facilitating the handling or use of the materials.

Other objectives and features will become apparent to those skilled in the art from the following detailed description of the invention.

In preparing the cellular or foamed plastic materials, we employ a phenolic resin or resol, a gassing agent or medium, and a special catalyst.

The resin or resins are primarily derived from the reaction of phenols and aldehydes and their various analogues. The extent of the reaction is determined by the specific gravity, viscosity and water miscibility of the resin or resol and is governed partially, at least, by the type of catalyst employed. The phenolic resins which we utilize in the formulations of the cellular products of the invention may be defined as acid catalyzable water miscible resol type resins which are the reaction products of phenolic types of compounds such as polyhydric phenols; phenols; amino phenols; halogen, amino, carboxy, nitro, saturated or unsaturated alkyls or aryl substituted phenols; with aldehydes, such as formaldehyde, alkyl aldehydes, aryl aldehydes, poly aldehydes, furan aldehydes, amino or halo aldehydes, nitro substituted aldehydes. Any combination of these with alkyl or aryl amines, aldoses, alcohols or epoxy compounds may be used when further modification is required. It has been found that the physical strength properties of the resultant cellular or foamed products can be controlled to some extent by varying or adjusting the specific gravity of the phenolic resin employed. Thus a substantial range of physical as well as chemical properties may be obtained in the resultant foamed material where the specific gravity of the phenolic resin employed is varied between 1.15 and 1.35. It has also been found that a rather close or accurate adjustment or standardization of the specific gravity for any given set of physical properties of the resultant product is desirable. The reaction of a given phenol with a specific aldehyde takes place in accordance with the established and well known methods. The resinification reaction is performed in an aqueous solution with an alkaline catalyst such as a metallic oxide, metallic carbonate, metallic hydroxide or metallic salt having an alkaline hydrolysis such as sodium citrate, sodium oxalate, etc. to yield a fluid resol, the viscosity of the latter being controlled by the extent of the reaction and the amount of water removed.

In preparing a typical phenolic resin for use in our making our cellular materials a mixture containing:

| | |
|---|---|
| A phenol | 1 mol. |
| An aldehyde; e. g. formaldehyde | 1 to 2.5 mols. |
| Alkaline catalyst | 0.003 to 0.03 mol. |
| Water | 10–50% by weight of the charge. | is reacted at the reflux temperature from 15 minutes to 2 hours. The mass is then neutralized with a suitable acid such as acetic, phosphoric, oxalic, or the like, to a pH of about 7 and is vacuum distilled to remove the excess water until the specific gravity ranges between 1.15 and 1.35. The synthesis of certain of the phenolic resins, as employed in the invention, require catalysts, generally basic type compounds such as metallic oxides, carbonates, and hydroxides. Barium hydroxide may be found to be preferred catalyst. Other suitable catalysts are:

Metallic oxides:
    Calcium oxide
    Magnesium oxide
    Barium oxide
    Lithium oxide
    Zinc oxide
    Sodium oxide
    Potassium oxide Metallic carbonates:
    Calcium carbonate
    Magnesium carbonate
    Barium carbonate
    Lithium carbonate
    Zinc carbonate
    Sodium carbonate
    Potassium carbonate Metallic hydroxides:
    Calcium hydroxide
    Magnesium hydroxide
    Lithium hydroxide
    Zinc hydroxide
    Sodium hydroxide
    Potassium hydroxide The following are illustrative formulations of phenolic resins suitable for incorporation in the reactant or foaming phenolic resin products of the invention:

RESIN 1
| | |
|---|---|
| Phenol | 1 mol. |
| Formaldehyde | 1 to 2.5 mols. |
| Barium hydroxide 8H$_2$O | 0.003 to 0.020 mol. |

RESIN 2
| | |
|---|---|
| Para-isopropyl phenol | 1 mol. |
| Formaldehyde | 1 to 2.5 mols. |
| Calcium carbonate | 0.003 to 0.020 mol. |

RESIN 3
| | |
|---|---|
| Phenol | 1 mol total (the P,P'sec butylidenediphenol being in the proportion of from 5 to 75% by mol weight). |
| P,P'sec butylidenediphenol | |
| Formaldehyde | 1 to 2.5 mols. |
| Calcium oxide | 0.003 to 0.020 mol. |

RESIN 4
| | |
|---|---|
| Phenol | 1 mol total (the O,O'diphenol being in the proportion of from 5 to 75% by mol weight). |
| O,O'diphenol | |
| Formaldehyde | 1 to 2.5 mols. |
| Potassium oxalate | 0.003 to 0.020 mol. |

RESIN 5
| | |
|---|---|
| Phenol | 1 mol total (the parachloro phenol being in the proportion of from 5 to 75% by mol weight). |
| Parachloro phenol | |
| Formaldehyde | 1 to 2.5 mols. |
| Barium hydroxide 8H$_2$O | 0.003 to 0.020 mol. |

RESIN 6
| | |
|---|---|
| Parahydroxy benzoic acid | 1 mol total (the parahydroxy benzoic acid being in the proportion of from 5 to 75% by mol weight). |
| Phenol | |
| Formaldehyde | 1 to 2.5 mols. |
| Barium hydroxide 8H$_2$O | 0.003 to 0.020 mol. |

RESIN 7
| | |
|---|---|
| Phenol | 1 mol total (the cresol being in the proportion of from 5 to 75% by mol weight). |
| Cresol (ortho, meta, para or mixture thereof) | |
| Formaldehyde | 1 to 2.5 mols. |
| Calcium hydroxide | 0.003 to 0.020 mol. |

RESIN 8
| | |
|---|---|
| Phenol | 1 mol. |
| Formaldehyde | 1 to 2.5 mols total (the furfural being in the proportion of from 5 to 50% by mol weight). |
| Furfural | |
| Barium hydroxide 8H$_2$O | 0.003 to 0.020 mol. |

RESIN 9
| | |
|---|---|
| Phenol | 1 mol. |
| Acetaldehyde | 1 to 2.5 mols total (the acetaldehyde being in the proportion of from 5 to 50% by mol weight). |
| Formaldehyde | |
| Barium hydroxide 8H$_2$O | 0.003 to 0.020 mol. |

RESIN 10
| | |
|---|---|
| Phenol | 1 mol. |
| Benzaldehyde | 1 to 2.5 mols total (the benzaldehyde being in the proportion of from 5 to 50% by mol weight). |
| Formaldehyde | |
| Barium hydroxide 8H$_2$O | 0.003 to 0.020 mol. |

RESIN 11
| | |
|---|---|
| Phenol | 1 mol total (the para nitro phenol being in the proportion of from 5 to 75% by mol weight). |
| Para (ortho) nitro phenol | |
| Formaldehyde | 1 to 2.5 mols. |
| Barium hydroxide 8H$_2$O | 0.003 to 0.020 mol. |

RESIN 12
| | |
|---|---|
| Alpha (or beta) naphthol | 1 mol total (the naphthol being in the proportion of from 5 to 75% by mol weight). |
| Phenol | |
| Formaldehyde | 1 to 2.5 mols. |
| Magnesium carbonate | 0.003 to 0.020 mol. |

RESIN 13
| | |
|---|---|
| Phenol | 1 mol. |
| Methyl ethyl ketone | 0.5 to 1 mol. |
| Formaldehyde | 1 to 2.5 mols. |
| Barium hydroxide 8H$_2$O | 0.003 to 0.020 mol. |

RESIN 14
| | |
|---|---|
| Phenol | 1 mol. |
| Dextrose | 0.5 to 1 mol. |
| Formaldehyde | 1 to 2.5 mols. |
| Barium hydroxide 8H$_2$O | 0.003 to 0.020 mol. |

RESIN 15
| | |
|---|---|
| Phenol | 1 mol. |
| Glyoxal (as polyglyoxal) | 1 to 2.5 mols total (the glyoxal being in the proportion of from 5 to 50% mol weight). |
| Formaldehyde | |
| Barium hydroxide 8H$_2$O | 0.003 to 0.020 mol. |

RESIN 16
| | |
|---|---|
| Phenol | 1 mol. |
| Ortho hydroxybenzyl alcohol | 0.5 to 1 mol. |
| Formaldehyde | 1 to 2.5 mols. |
| Barium hydroxide 8H$_2$O | 0.003 to 0.020 mol. |

RESIN 17
| | |
|---|---|
| Phenol | 1 mol. |
| Furfural | 1 to 2.5 mols. |
| Ketone (acetone, methyl ethyl ketone) | 0.5 to 1 mol. |
| Barium hydroxide 8H$_2$O | 0.003 to 0.020 mol. |

RESIN 18
| | |
|---|---|
| Phenol | 1 mol. |
| Formaldehyde | 1 to 2.5 mols. |
| Polyvinyl alcohol | 1 to 15% by weight of the total weight of the phenol and formaldehyde. |
| Barium hydroxide 8H$_2$O | 0.003 to 0.020 mol. |

We have found that the use of polyvinyl alcohol and/or polyvinyl alcohol chloride in preparing the phenolic resins or resols for incorporation in the foamed or cellular plastics of the invention is productive of superior results. The polyvinyl alcohol or chloride is used in the proportion range of from 0.5 to 20% by weight of the combined weight of the other components. The polyvinyl alcohol serves to control the exothermic temperature during the foaming reaction allowing greater freedom of action and handling of the reactant mixture during the foaming period. The polyvinyl alcohol acts as a viscosity modifier and increases the toughness, elasticity and flexibility of the final products.

It will be noted that resins 18 to 28 include polyvinyl alcohol in their formulations.

RESIN 19
| | |
|---|---|
| Phenol | 1 mol. |
| Terpineol | 0.25 to 1 mol. |
| Formaldehyde | 1 to 2.5 mols. |
| Barium hydroxide 8H$_2$O | 0.003 to 0.020 mol. |
| Polyvinyl alcohol | 1 to 15% by weight of the combined weight of the other components. |

RESIN 20
| | |
|---|---|
| Sodium benzene sulfonate | 0.5 to 1 mol. |
| Phenol | 1 mol. |
| Formaldehyde | 1 to 2.5 mols. |
| Barium hydroxide | 0.003 to 0.020 mol. |
| Polyvinyl alcohol | 1 to 15% by weight of the combined weight of the other components. |

RESIN 21
| | |
|---|---|
| Glycerol | 0.25 to 1 mol. |
| Phenol | 1 mol. |
| Formaldehyde | 1 to 2.5 mols. |
| Barium hydroxide | 0.003 to 0.020 mol. |
| Polyvinyl alcohol | 1 to 15% by weight of the combined weight of the other components. |

In preparing Resin 21, other polyhydric alcohols, such as glycols and amino alcohols may be used instead of the glycerol in the same proportion as the glycerol.

RESIN 22

| | |
|---|---|
| Phenol | 1 mol. |
| Formaldehyde | 1 to 2.5 mols. |
| Barium hydroxide 8H$_2$O | 0.003 to 0.020 mol. |
| Epichlorohydrin | 5 to 20% by weight of the combined weight of the phenol and formaldehyde. |
| Polyvinyl alcohol | 1 to 15% by weight of the combined weight of the other components. |

RESIN 23

| | |
|---|---|
| Phenol | 1 mol. |
| Furfural | 1 to 2.5 mols total (the furfural being in the proportion of from 5 to 50% by mol weight). |
| Formaldehyde | |
| Polyvinyl alcohol | 5 to 50 grams. |
| Barium hydroxide 8H$_2$O | 0.003 to 0.020 mol. |

RESIN 24

| | |
|---|---|
| Phenol | 1 mol total (the bisphenol being in the proportion of from 5 to 75% by mol weight). |
| Bisphenol A (P,P'propylidene-(diphenol) | |
| Formaldehyde | 1 to 2.5 mols. |
| Epichlorohydrin | 0.25 to 1 mol. |
| Barium hydroxide | 0.003 to 0.020 mol. |
| Polyvinyl alcohol | 1 to 15% by weight of the combined weight of the other components. |

RESIN 25

| | |
|---|---|
| Phenol | 1 mol total (the P,P'diphenol being in the proportion of from 5 to 75% by mol weight). |
| P,P'diphenol | |
| Epichlorohydrin | 0.25 to 1 mol. |
| Formaldehyde | 1 to 2.5 mols. |
| Barium hydroxide | 0.003 to 0.020 mol. |
| Polyvinyl alcohol | 1 to 15% by weight of the combined weight of the other components. |

RESIN 26

| | |
|---|---|
| Phenol | 1 mol total (the resorcinol being in the proportion of from 5 to 75% by mol weight). |
| Resorcinol | |
| Formaldehyde | 1 to 2.5 mols. |
| Barium hydroxide 8H$_2$O | 0.003 to 0.020 mol. |
| Polyvinyl alcohol | 1 to 15% by weight of the combined weight of the other components. |

RESIN 27

| | |
|---|---|
| Phenol | 1 mol total (the catechol being in the proportion of from 5 to 75% by mol weight). |
| Catechol (o, m, p) | |
| Formaldehyde | 1 to 2.5 mols. |
| Barium hydroxide 8H$_2$O | 0.003 to 0.020 mol. |
| Polyvinyl alcohol | 1 to 15% by weight of the combined weight of the other components. |

RESIN 28

| | |
|---|---|
| Phenol | 1 mol. |
| Formaldehyde | 1 to 2.5 mols. |
| n-Propylamine | 0.25 to 1 mol. |
| Barium hydroxide 8H$_2$O | 0.003 to 0.020 mol. |
| Polyvinyl alcohol | 1 to 15% by weight of the combined weight of the other components. |

Where formaldehyde is employed in synthesizing any of the above phenolic resols, it may preferably be used in an aqueous solution having a formaldehyde concentration of from 30 to 40% by weight, usually about 37% by weight.

The catalysts used in the reactant cellular material-producing mixture are important in obtaining the desired products of good physical characteristics. The particular catalyst employed, together with the gassing agent or agents provide the flexibility, controlled rise of the phenolic mass, and the adhesion, final cure and excellent physical strength of the resultant cellular plastic. The acid catalyst serves to liberate or generate hydrogen, nitrogen, carbon dioxide, or other gas to produce the foaming of the resin mass and also effects a cure of the foamed resin. We prefer to employ a mixture or blend of acids and water as the catayst and have found that such a blend is particularly effective in foaming the phenolic resins and in producing a cellular plastic product of superior physical characteristics. A concentration range of the catalyst blend or mixture of from ½ to 20% by weight of the resin has been found to be satisfactory. One catalyst which we have found to be particularly effective comprises a benzene sulfonic acid, or the equivalent, and a phosphoric acid. The phosphoric acid serves to limit or control the cure rate of the foamed resin mass. The sulfonic acids or sufonic acid derivatives that we may use in this catalyst blend include benzene sulfonic acid, phenol sulfonic acid, meta benzene disulfonic acid, and toluene sulfonic acid. Such a catalyst, which we shall term Catalyst I, may include, for example:

*Catalyst I*

| | Percent by weight |
|---|---|
| Benzene sulfonic acid | 20 |
| Orthophosphoric acid (85% by weight concentration in an aqueous solution) | 45 |
| Water | 35 |

The benzene sulfonic acid, or any of the equivalents thereof named above, the phosphoric acid solution, and the water of Catalyst I may be employed in the proportion ranges of:

| | Catalyst I | | | | |
|---|---|---|---|---|---|
| | a | b | c | d | e |
| | Percent | Percent | Percent | Percent | Percent |
| Benzene sulfonic acid (or equivalent) | 20 | 20 | 20 | 5 | 50 |
| 85% aqueous orthophosphoric acid | 10 | 45 | 70 | 75 | 25 |
| Water | 70 | 35 | 10 | 20 | 25 |

In subsequent examples the catalyst will be designated Catalyst I–a, Catalyst I–b, Catalyst I–c, etc., reference being to the above table. If desired, phosphorous pentoxide may be substituted for the orthophosphoric acid in Catalysts I–a to I–e inclusive.

The invention includes, in some instances, the use of unsaturated polyester-phenolic resin blends in formulating the cellular or foamed plastics. In such cases unsaturated polyester resins are mixed or blended with a phenolic resin, such as previously described, to form the resin blend or mixture that is catalyzed or foamed by the additives. Examples of unsaturated polyester resins that may be employed in this manner may be formulated from:

RESIN 29

| | |
|---|---|
| Diethylene glycol | 6.3 mols. |
| Fumaric acid | 5 mols. |
| Sebacic acid | 1 mol. |

Acid No. between 35 and 60 and preferably about 45.

RESIN 30

| | |
|---|---|
| Ethylene glycol | 5.2 mols. |
| Maleic anhydride | 4 mols. |
| Adipic acid | 1 mol. |

Acid No. between 20 and 60 and preferably about 40.

RESIN 31

| | |
|---|---|
| Diethylene glycol | 1.1 mols. |
| Maleic anhydride | 1 mol. |

Acid No. between 20 and 60 and preferably about 40.

Where the resin blend or mass includes such unsaturated polyester resins, we prefer to use a catalyst including a boron complex such as boron trifluoride. The following is an example of such a catalyst, which will designate Catalyst II.

*Catalyst II*

| | Percent by weight |
|---|---|
| Benzene sulfonic acid | 20 |
| Orthophosphoric acid (85% by weight concentration in an aqueous solution) | 45 |
| Water | 34 |
| BF$_3$ ether complex | 1 |

The following are illustrative of the boron complexes that may be employed in formulating Catalyst II.

Boron trifluoride phenol complex
Boron trifluoride ethyl ether complex
Boron trifluoride butyl ether complex
Boron trifluoride ammonia complex The ingredients of Catalyst II may have the same ranges of proportions as those of Catalyst I set forth in the above table, with the boron trifluoride complex constituting between 1 and 5% by weight of the total.

The gassing agent, or agents, that may be employed in preparing the cellular phenolic products may be selected from carbonates, bicarbonates, or nitrites of potassium, sodium, magnesium, zinc and aluminum. Such agents, when catalyzed by or reacted with the selected catalyst, liberate a gas or gasses to form the cells of the foamed or cellular plastic. However, superior results are obtained when a selected metallic leafing powder or a combination of metallic leafing powders is used as the gassing agent. We wish to emphasize that these outstandingly superior results are achieved by the use of leafing powder, as distinguished from non-leafing powder. The leafing powder, by reason of the physical shape of its particles or "leaflets," readily distributes uniformly throughout the mass of resin as distinguished from non-leafing powder where the particles do not have the ability to distribute in this manner but, on the contrary, tend to settle or gather in lumps or masses. Furthermore, in the manufacture of metallic leafing powder its particles or platelets are lubricated by and coated with a lubricant. This coating is believed to cause an effective distribution of the metal particles in the phenolic resin or phenolic and unsaturated polyester resin blend, while at the same time delaying or controlling the access of the acid catalyst to the metal particles. It is believed that these mechanisms or actions may account in part for the unexpectedly uniform cell size and uniform cell distribution through the mass of foaming resin, the well distributed metal particles and the controlled reaction with the metal producing the unusual results. The metallic leafing powder, or combination of metallic leafing powders, may be used in the range from .01% to 20% by weight of the total formula to produce a cellular product where the density ranges from 30 pounds per cubic foot to 1 pound, or less, per cubic foot. Where the above mentioned carbonates or bicarbonates are used as gassing agents, they may be employed in the proportion of from .01% to 20% by weight of the total weight of the formulation. The metallic leafing powder, which we employ in our formulations, is either aluminum leafing powder, magnesium leafing powder, iron leafing powder, or zinc leafing powder. We have obtained outstanding results using aluminum leafing powder of not less than 100 mesh and preferably approximately 400 mesh.

In the following formulations for the cellular phenolic plastics incorporating the metallic leafing powders and in the subsequent examples the proportions are in percentages by weight of the total weight. Examples 1, 2 and 3 are illustrative of various concentrations of the metallic leafing powder gassing agent.

EXAMPLE 1

| | Percent |
|---|---|
| Resin No. 1 | 90.0 |
| Aluminum leafing powder, 400 mesh | 0.1 |
| Catalyst I-b (containing 20% benzene sulfonic acid and 45% orthophosphoric acid aqueous solution) | 9.9 |

Where the gassing agent is used in this relatively small proportion there is a low rise of the resin mass and the resultant cellular product has a relative high density.

EXAMPLE 2

| | Percent |
|---|---|
| Resin No. 8 | 90.0 |
| Aluminum leafing powder, 400 mesh | 0.4 |
| Catalyst I-a, containing 20% benzene sulfonic acid and 10% of the orthophosphoric acid aqueous solution | 9.6 |

The concentration of gassing agent or aluminum leafing powder of Example 2 provides for the production of cellular foams or products of medium density.

EXAMPLE 3

| | Percent |
|---|---|
| Resin No. 1 | 90.0 |
| Aluminum leafing powder, 400 mesh | 20.0 |
| Catalyst I-b, containing 20% benzene sulfonic acid and 45% of the orthophosphoric acid aqueous solution | 8.0 |

This concentration of the metallic leafing powder results in a light tenuous cellular or foamed product.

Referring again to the above described Catalyst II, this type of catalyst is primarily intended for use with a phenolic resin blend containing an unsaturated polyester resin which is the reaction product of unsaturated acids or alcohols with each other or with saturated or unsaturated polybasic acids and/or polyhydric alcohols. More specifically these unsaturated polyester or alkyd resins are the reaction products between α, β unsaturated organic acids chosen from the group including maleic, fumaric, itaconic, chlormaleic and citraconic acids and polyhydric alcohols, preferably those containing only primary hydroxyl groups for rapid esterification, such as the glycols, and which may contain as modifying substances dibasic acids that do not contain groups that will react by polymerization with ethylenic-containing groups, i. e.

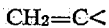

such as phthalic anhydride, adipic acid, succinic acid, sebacic acid, etc. The unsaturated polyester resins may be employed in the proportion of from 20% to 88% of the total weight of the resins. Examples 4 and 4-A are typical formulations employing an unsaturated polyester resin such as above described.

EXAMPLE 4

| | Percent |
|---|---|
| Unsaturated polyester Resin No. 29 | 46.0 |
| Phenolic Resin No. 1 | 45.0 |
| Catalyst No. II | 8.7 |
| Aluminum leafing powder, 400 mesh | 0.3 |

EXAMPLE 4-A

| | Percent |
|---|---|
| Unsaturated polyester Resin No. 30 | 66.0 |
| Phenolic Resin No. 1 | 31.0 |
| Catalyst No. II | 8.7 |
| Aluminum leafing powder, 400 mesh | 0.3 |

The following Examples 5 to 7 inclusive, are representative of the formulations incorporating phenolic resins produced from or including phenol, catechol, quinol, pyrogallol, resorcinol α and β, naphthol, and anthrol.

EXAMPLE 5

| | Percent |
|---|---|
| Resin No. 19 | 98.7 |
| Catalyst I-c | 1.0 |
| Aluminum leafing powder, 400 mesh | 0.3 |

EXAMPLE 6

| | Percent |
|---|---|
| Resin No. 12 | 90.0 |
| Catalyst I-d | 5.0 |
| Aluminum leafing powder, 400 mesh | 5.0 |

EXAMPLE 7

| | Percent |
|---|---|
| Resin No. 27 | 84.7 |
| Catalyst I-e | 15.0 |
| Aluminum leafing powder, 400 mesh | 0.3 |

Examples 8, 9 and 10, which follow, incorporate phenolic resins made from substituted phenols represented by such phenols as ortho-, meta-paranitrophenol; ortho- or paradinitrophenol; ortho-, paraaminophenol; ortho- or paradiaminophenol; ortho-, parachlorobenzene; and ortho-, paradichlorobenzene.

EXAMPLE 8

| | Percent |
|---|---|
| Resin No. 2 | 98.7 |
| Catalyst I-c | 1.0 |
| Zinc leafing powder | 0.3 |

EXAMPLE 9

| | Percent |
|---|---|
| Resin No. 5 | 84.7 |
| Catalyst I-b | 15.0 |
| Aluminum leafing powder, 400 mesh | 0.3 |

EXAMPLE 10

| | Percent |
|---|---|
| Resin No. 11 | 90.0 |
| Catalyst I-b | 5.0 |
| Aluminum leafing powder, 400 mesh | 5.0 |

The following Examples, 11, 12, and 13, are representative of the employment of a class of phenolic resins wherein an aldehyde other than formaldehyde is employed in preparing the resin. Various aldehydes may be used with any of the phenols previously considered and examples of such aldehydes are acetaldehyde, crotonaldehyde, polyformaldehyde, benzaldehyde, furfural, heptaldehyde, gloyoxal, or substituted aldehydes.

EXAMPLE 11

| | Percent |
|---|---|
| Resin No. 23 | 98.7 |
| Catalyst I-b | 1.0 |
| Aluminum leafing powder, 400 mesh | 0.3 |

EXAMPLE 12

| | Percent |
|---|---|
| Resin No. 17 | 94.9 |
| Catalyst I-a | 5.0 |
| Iron leafing powder | 0.1 |

EXAMPLE 13

| | Percent |
|---|---|
| Resin No. 15 | 90.0 |
| Catalyst I-a | 5.0 |
| Magnesium leafing powder | 5.0 |

Examples 14 and 15 which follow, exemplify the employment of phenolic resins containing ketones employed in effecting modification of the phenolic resin such as acetone, methyl ethyl ketone, and benzophenone.

EXAMPLE 14

| | Percent |
|---|---|
| Resin No. 13 | 98.7 |
| Catalyst I-b | 1.0 |
| Aluminum leafing powder, 422 mesh | 0.3 |

EXAMPLE 15

| | Percent |
|---|---|
| Resin No. 17 | 90.0 |
| Catalyst I-b | 5.0 |
| Aluminum leafing powder, 422 mesh | 5.0 |

Examples 16 and 17 which follow, are representative of formulations employing phenolic foams made from phenolic resins modified by reacting phenols such as phenol, catechol, quinol, pyrogallol, resorcinol, naphthol and substituted phenols such as ortho-, meta-para-nitrophenol; ortho- or paradinitrophenol; ortho-, para amino-phenol; etc. with amines such as alkyl amines: propylamine, amylamine, secpropylamine; and aryl amines: aniline, xylidine, and toluene.

EXAMPLE 16

| | Percent |
|---|---|
| Resin No. 28 | 84.7 |
| Catalyst I-b | 15.0 |
| Aluminum leafing powder, 400 mesh | 0.3 |

EXAMPLE 17

| | Percent |
|---|---|
| Resin No. 29 | 94.7 |
| Catalyst I-b | 5.0 |
| Aluminum leafing powder, 400 mesh | 0.3 |

The following Examples 18, 19 and 20, include phenolic resins requiring the reaction of phenols and substituted phenols such as phenol, catechol, quinol, resorcinol, ortho-, meta-para-nitrophenol, ortho- or paradinitrophenol, ortho-, para aminophenol, or the like, with aldehydes such as polyformaldehyde, acetaldehyde, crotonaldehyde, furfural, etc. and with various compounds having active hydroxyl terminal groupings such as glycerol, mannitol and terpineol.

EXAMPLE 18

| | Percent |
|---|---|
| Resin No. 16 | 98.7 |
| Catalyst I-b | 1.0 |
| Aluminum leafing powder, 400 mesh | 0.3 |

EXAMPLE 19

| | Percent |
|---|---|
| Resin No. 18 | 84.7 |
| Catalyst I-b | 15.0 |
| Aluminum leafing powder, 400 mesh | 0.3 |

EXAMPLE 20

| | Percent |
|---|---|
| Resin No. 21 | 90.0 |
| Catalyst I-b | 5.0 |
| Aluminum leafing powder, 400 mesh | 5.0 |

In preparing the foamed or cellular phenolic resin materials of the invention the selected phenolic resin or resol, or the selected blend of phenolic resol and unsaturated polyester resin and the gassing agent, for example the leafing powder, are thoroughly mixed together to form one component or "package." Other additives such as dyes, fillers, etc. when used are also mixed with these ingredients. In a like manner the ingredients of Catalyst I or II are mixed together to form another component or package. When it is desired to prepare and apply or use the foamed product these two "packages" are mixed together and the resultant reactant mixture is then applied by pouring, brushing, blading, dripping, or the like. The foaming reaction which produces the cellular resin product is accompanied by exothermic heat which sets the foam or cellular mass and it is desirable to post cure the product for several hours at slightly elevated temperatures.

It should be understood that the invention is not based upon or dependent upon the theories which we have expressed. Nor is the invention to be regarded as limited to the express procedure or materials set forth, these details being given only by way of illustration and to aid in clarifying the invention. We do not regard such specific details as essential to the invention except insofar as they are expressed by way of limitation in the following claims in which it is our intention to claim all novelty inherent in the invention as broadly as is permissable in view of the prior art.

We claim:

1. The method of making a cellular plastic material which comprises the incorporation in an acid catalyzable, water miscible phenol-aldehyde resol having a specific gravity of between 1.15 and 1.35 and a pH of about 7 of from about 0.01% to about 20% of the total weight of the other ingredients of a gassing agent selected from the class consisting of: aluminum leafing powder, magnesium leafing powder, iron leafing powder, zinc leafing powder, and then mixing with said resol-gassing agent mixture a catalyst in the amount of from about 0.5% to 20% of the weight of the resol, the catalyst containing from about 5% to 50% benzene sulfonic acid, from about 10% to 75% of an 85% concentration of orthophosphoric acid in an aqueous solution, the catalyst reacting with the resol-gassing agent mixture to consume the gassing agent and form the cellular material.

2. The method of making a cellular plastic material which comprises the incorporation in an acid catalyzable, water miscible phenol-aldehyde resol having a specific gravity of between 1.15 and 1.35 and a pH of about 7 of from about 0.01% to about 20% of the total weight of the other ingredients of a gassing agent selected from the class consisting of: aluminum leafing powder, magnesium leafing powder, iron leafing powder, zinc leafing powder, and then mixing with said resol-gassing agent mixture a catalyst in the amount of from about 0.5% to 20% of the weight of the resol, the catalyst being an aqueous acidic blend of benzene sulfonic acid and orthophosphoric acid which consume and gassifies the gassing agent to form the cellular material.

3. The method of making cellular plastic material which comprises the incorporation in an acid catalyzable, water miscible phenol-aldehyde resol having a specific gravity of between 1.15 and 1.35 and a pH of about 7 of from 0.01% to 20% of the total weight of the other ingredients of a gassing agent selected from the group consisting of: aluminum leafing powder, magnesium leafing powder, iron leafing powder, zinc leafing powder, and then mixing with said resol-gassing agent mixture a catalyst containing about 20% benzene sulfonic acid, about 45% of an 85% concentration of orthophosphoric acid in an aqueous solution and about 35% water to react with the resol-gassing agent mixture to consume the gassing agent and form a cellular phenolic material, the catalyst being employed in the proportion of 0.5% to 20% of the weight of the resol.

4. The method which comprises mixing on an approximate percentage by weight basis 90% of an acid catalyzable water miscible phenol-aldehyde resol having a pH of about 7 and a specific gravity of between 1.15 and 1.35 prepared from 1 mol phenol, from 1 to 2.5 mols formaldehyde and from 0.003 to 0.020 mols barium hydroxide and 1% aluminum leafing powder, and then mixing with the resultant resin-leafing powder mixture an acid catalyst comprising from 20% to 50% benzene sulfonic acid, from 10% to 25% of an 85% concentration of orthophosphoric acid in an aqueous solution and from 10% to 70% water, to react with the resin-leafing powder mixture to gassify the aluminum powder and form a cellular phenolic material, the catalyst being used in the proportion to constitute the balance of the mix.

References Cited in the file of this patent

UNITED STATES PATENTS

| | | |
|---|---|---|
| 2,337,874 | D'Alelio | Dec. 28, 1943 |
| 2,376,653 | Boyer | May 22, 1946 |
| 2,398,703 | Gardner | Apr. 16, 1946 |
| 2,446,429 | Nelson et al. | Aug. 3, 1948 |
| 2,559,891 | Meyer | July 10, 1951 |
| 2,577,280 | Simon et al. | Dec. 4, 1951 |
| 2,582,228 | Brinkema | Jan. 15, 1952 |
| 2,629,698 | Sterling | Feb. 24, 1953 |

FOREIGN PATENTS

| | | |
|---|---|---|
| 361,910 | Great Britain | Nov. 16, 1931 |
| 481,069 | Great Britain | Mar. 4, 1938 |

OTHER REFERENCES

German Plastics Practice by De Bell, Gloor and Goggin, 1946, pages 455 and 464.